Patented July 16, 1946

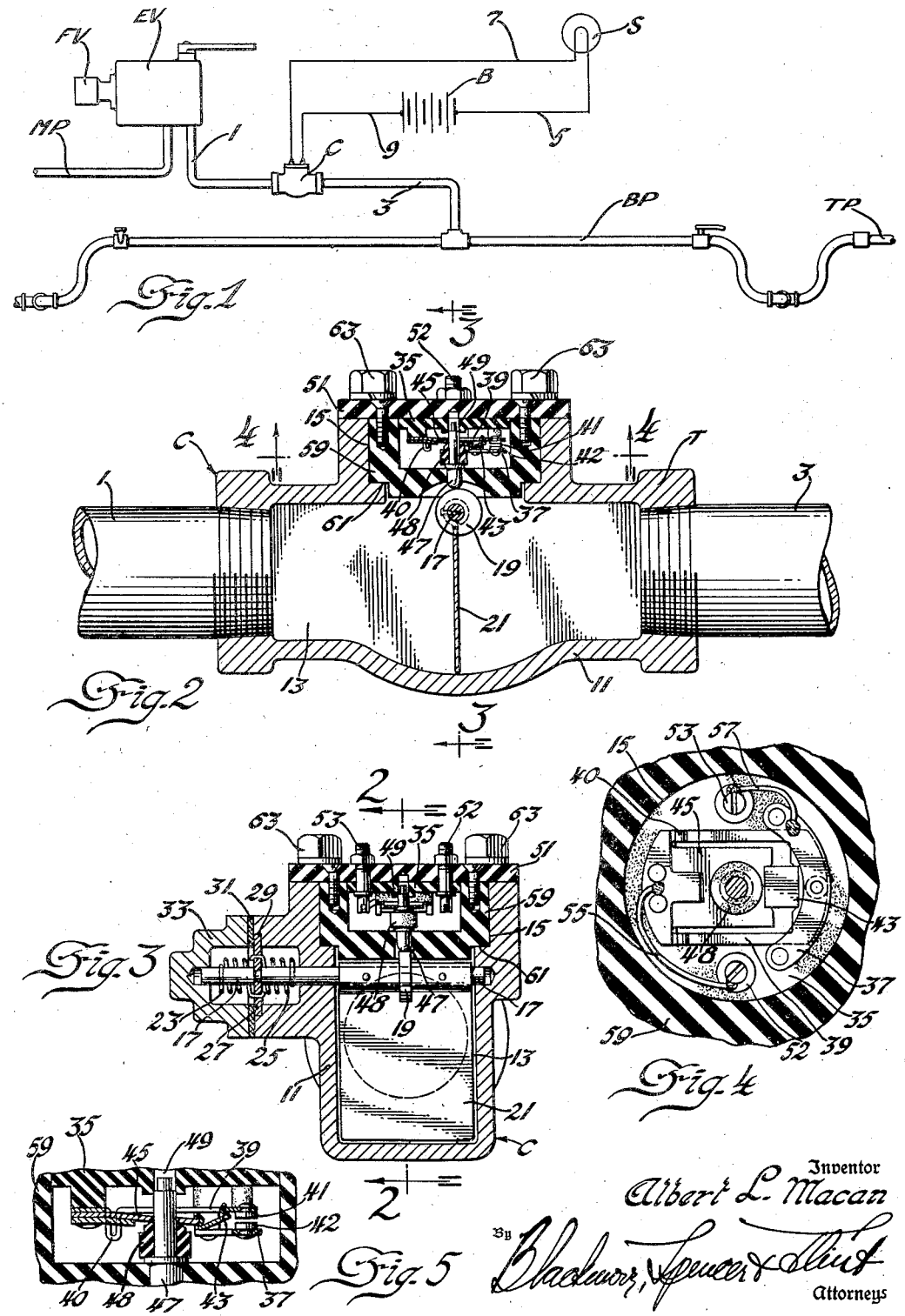

2,403,938

UNITED STATES PATENT OFFICE 2,403,938

AIR BRAKE SIGNAL SYSTEM

Albert L. Macan, La Grange, Ill., assignor to General Motors Corporation, Detroit, Mich., a corporation of Delaware Application April 17, 1943, Serial No. 483,516

4 Claims. (Cl. 177—311)

The present invention relates to locomotive air brake systems and more particularly to indicating means therefor.

It has been found that the conventional pressure operated gauges included in air brake systems are inadequate for properly indicating certain conditions in the brake pipe of the locomotive and train brake pipe line connected thereto, especially on locomotives provided with large capacity compressors capable of maintaining normal pressure in the train pipe of long trains of cars or partial normal pressure portions in the train pipe upon a reduction in pressure therein due to leaky or broken train line connections or upon operation of the conductor's valve at the rear end of the train.

The principal object of the present invention is to provide a simple air brake signal system which is readily installed in conventional air brake systems and which responds promptly to normal and abnormal conditions of air flow to the locomotive brake pipe and train pipe from the main air reservoir and compressor on the locomotive.

The air brake signal system and connections by which the above object is accomplished will become apparent by reference to the following detailed description and accompanying drawing illustrating one form of locomotive air brake signal system which has been found to satisfactorily indicate the conditions occurring in the train brake pipe of long trains of cars.

Figure 1 of the drawing is a diagrammatic view showing the air brake signal system and its connections with a portion of conventional locomotive air brake system.

Figure 2 of the drawing is a longitudinal transverse sectional view taken on line 2—2 of Figure 3 to show certain of the details of the pneumatically actuated signal control switch.

Figure 3 is a transverse sectional view taken on line 3—3 of Fig. 2.

Figure 4 is an enlarged view taken on line 4—4 of Fig. 2 with parts broken away and Figure 5 is an enlargement of a portion of Figure 2 with parts broken away and in section.

In Figure 1 the portion of a conventional air brake system for a locomotive, shown, includes only the means by which air is supplied to or released from the locomotive brake pipe and train pipe. The locomotive brake pipe is indicated at BP and a portion of the train pipe TP is shown connected thereto by air hoses in conventional manner. The engineer's valve EV is connected in conventional manner between a main reservoir pipe MP and the brake pipe BP to control the pressure therein. The connection between the engineer's valve and brake pipe includes pipes 1 and 3 and a pneumatically actuated electrical signal control switch C for controlling an electrical signal S located in the locomotive cab, not shown, adjacent the engineer's valve. The signal S may be a signal lamp, as shown, or any other type of visual or audible indicator, as desired. The engineer's valve is connected in conventional manner to an automatic feed valve FV so that when the engineer's valve is moved to the running position air will be supplied to the brake and train pipes through the feed valve FV and the engineer's valve at a normal rate of flow, and when the engineer's valve is moved to the full release position air will be supplied at an increased rate to these pipes directly through the engineer's valve from the main reservoir pipe MP to obtain quick charging of the train pipe. The feed valve FV is adjusted in a well known manner to open and close automatically in order to maintain normal pressure in the brake and train pipes. Movement of the engineer's valve to the service or emergency application positions causes a slower or faster release of the pressure in the brake and train pipes to obtain a service or emergency air brake application.

The pneumatically actuated signalling control switch C is electrically connected in series with a battery B and the signal S by electrical conductors 5, 7 and 9. This control switch, as best shown in Figures 2, 3, 4 and 5, comprises a hollow, inverted T-shaped housing 11 provided with a horizontal air passage 13 of rectangular cross section and a vertical passage 15 of circular cross section. The pipes 1 and 3 are threaded in openings in the opposite ends of the air passage 13 and an electrical switch mechanism of a well known type, to be described, is mounted in the vertical passage 15. The pneumatic actuating means for the switch mechanism comprises a shaft 17 which is mounted in suitable bearing portions in the housing 11 for rotation about an axis extending transversely across the upper portion of the horizontal passage 13 immediately adjacent the vertical passage 15, and a cam 19 and vane 21 are secured on the shaft 17. The vane 21 is rectangular in shape and its area is less than the area of the horizontal passage 13 so that it normally hangs vertically downward across the horizontal passage and is therefore moveable angularly from this normal position by air flowing through this passage in either direction, thereby to cause rotation of the shaft 17 and cam 19.

Centering means, shown best in Figure 3, are provided to normally retain the vane 21 in the vertical position, as shown, and to oppose movement thereof from this position by horizontal or vertical vibrations of the locomotive. The vane is moveable relative to the horizontal air passage 13 in the housing 1 when air flows therethrough at rates less or greater than the normal rate of charge or discharge of the brake and train pipes. The centering means comprises two opposed helical springs 23 and 25 arranged concentrically with respect to one end portion of the shaft 17 which projects through an opening in one of the shaft bearing portions of the housing. The springs 23 and 25 are connected between the shaft 17 and a member 27 shown clamped in a counterbore 29 in the side of the housing 11 by the gasket 31 and a cap member 33 which are removably secured to a side sealing surface of the housing to prevent leakage of air through the shaft opening.

The electrical switch mechanism, as has been previously mentioned, is of a well known type. This mechanism comprises a switch plate 35 of insulating material to which a contact bar 37 and a flexible contact arm 39 of curved shape are secured, as best shown in Figures 4 and 5. The contact bar 37 is shown fixed in spaced relation to the lower face of the plate 35. One end of the flexible contact arm 39 is fixed to the under side of the plate and is provided with a curved portion 40 adjacent the fixed end and a contact point 41 secured on the free end. The flexible contact arm is of such shape that the contact point 41 thereon is normally biased upwardly out of contact with a contact point 42 which is secured to the contact bar 37. A two part toggle mechanism 43—45 is operatively connected between the fixed and free end portions of the flexible contact arm. A push rod 47, on which an insulating bushing 48 is secured, is provided for causing upward movement of the toggle mechanism in order to cause downward and outward bending movement of the free end of the flexible contact arm 39 with respect to the fixed end, thereby to cause the contact point 41 thereon to move into wiping contact with the contact point 42 on the contact bar 37. The upper end of the push rod 47 is guided in an opening 49 in the switch plate 35. The contact plate 35 is secured to the under side an insulating cover plate 51 by a pair of binding posts 52 and 53. As best shown in Figures 1 and 4, the binding post 52 is connected by a conductor 55 to the fixed end of the flexible contact arm 39 and is also connected by the conductor 7 to one terminal of the signal lamp S. The other binding post 53 is connected by a conductor 57 to the contact bar 37 and is also connected by the conductor 9 to one terminal of the battery B, the other terminal of which is connected to the other terminal of the signal lamp.

The above described contact and contact closing mechanism is enclosed in a lower cap member 59 of insulating material which is of annular cross section and is also secured to the under side of the cover plate 51. The cap member is insertable in the vertical, circular opening 15 of the housing 11 and is provided with an external annular sealing surface 61 and an axial opening through which the smaller diameter lower end portion of the push rod 47 projects. The upper cover plate 51 is provided with suitable openings through which cap screws 63 extend, which cap screws are threaded into the upper face of the housing 11 to hold the cover plate in sealing contact with this face and to also hold the annular sealing surface 61 of the cap member 59 in sealing contact with an internal sealing surface of the vertical housing passage 15. With the cover plate 51 and cap member 59 secured to the housing in the above described manner, no leakage of air can occur from the vertical housing opening 15 and the lower end of the push rod 47 is biased downwardly into contact with the cam 19 by action of the flexible contact arm 39 on the toggle mechanism 43—45, which is then biased downwardly into contact with the upper end of the insulating bushing 48 on the push rod.

The cam 19 is formed so that it will move the push rod 47 upwardly and close the contact points 41—42 to cause illumination of the signal lamp S only when the vane 21 is moved counterclockwise by a flow of air to the brake and train pipes at a predetermined charging rate through the feed valve FV and engineer's valve EV, with the latter in the running position. The predetermined rate is slightly greater than that required to replenish allowable brake and train pipe leakage. When the brake and train pipes are charged to substantially normal pressure the rate of flow through the control switch C is reduced to a value such that the vane 21 will be moved back to its normal position by the spring centering means 23—25 to cause the switch contact points 41 and 42 to be opened, thereby deenergizing the signal S to indicate to the engineer that the train pipe is charged to normal pressure.

If the engineer's valve is inadvertently moved to the full release position after the train pipe is charged the resulting rate of air flow through the engineer's valve and control switch to the brake and train pipes causes reclosure of the switch contacts and illumination of the signal lamp to indicate overcharging of these pipes.

It will likewise be apparent that with the engineer's valve in the runnnig position, if the pressure is reduced in the train pipe below the normal value due to leaky or broken connection or operation of the conductor's valve at the rear end of the train, or upon movement of the engineer's valve to the service brake application position and then back to the running position the signal light will be illuminated as the feed valve FV will automatically open and allow air to flow through the control valve C to the train pipe under each of the above conditions.

It will be evident that when the engineer's valve EV is moved to the service or emergency brake application positions to reduce the pressure in brake and train pipes that the vane 21 will be moved clockwise and cause the cam 19 to be moved out of contact with the push rod 47 and therefore the signal lamp S will not be illuminated under these conditions of air flow to the engineer's valve from the brake and train pipes.

The above air brake signal system has been found to operate in the manner described thereby enabling the locomotive engineer to be promptly informed of normal or abnormal conditions of the air brake system, so that he may operate the engineer's valve to prevent overcharging, or to stop the complete train before it is parted by excessive leakage in a portion of the train pipe or upon operation of the conductor's valve at the rear end of the train; or to stop that portion of the train coupled to the locomotive upon parting of the train.

I claim:

1. An air brake system for a locomotive comprising a source of pressure, a brake pipe, means for controlling the pressure in the brake pipe and flow of pressure to and from the pipe to cause proper application and release of the brakes, said means being connected between the source of pressure and the brake pipe, a signal located adjacent the controlling means, two way pressure flow responsive signal control means connected between the pressure controlling means and brake pipe, said flow responsive control means being adapted to act in response to flow in excess of a predetermined rate necessary to compensate for normal leakage of air from the brake pipe, and control connections between said signal and signal control means to cause operation of said signal to indicate improper and dangerous conditions of leakage from the brake pipe and overcharging of said pipe.

2. An air brake system for a locomotive comprising a source of pressure, a brake pipe, means including pressure controlling means for said brake pipe, said controlling means being connected between the pipe and the pressure source and including automatic means for limiting the flow of air pressure to the brake pipe to a predetermined value to compensate for normal leakage and to maintain proper pressure therein, and manual means for permitting operation of said automatic means and for causing an increased rate of flow of pressure to or from said brake pipe to cause quick application and relief of pressure in said pipe, a signal located adjacent the manual control means, two way flow responsive signal control means connected between the pressure controlling means and the brake pipe and control connections between the signal and signal controlling means to cause operation of the signal only when there is excessive leakage from the brake pipe when the automatic means is operative, and to act also when the manual means is operated to cause quick charging of the brake pipe when the pipe is charged to proper pressure so that the signal operates to indicate overcharging of the brake pipe.

3. An air brake system for a locomotive comprising a source of pressure, a brake pipe, a feed valve and engineer's valve connected between the source of pressure and the brake pipe, said feed valve being adapted to act automatically to limit the rate of pressure flow to the brake pipe to compensate for normal leakage and to keep the pipe charged to proper pressure to cause release of the brakes, said engineer's valve being movable to a running position to connect the feed valve with the brake pipe, and movable to full release position to cause an increase of pressure and rate of charging of the brake pipe and quick release of the brakes, and movable to service and emergency braking positions to relieve the pressure in the brake pipe to cause service and emergency application of the brakes, a signal located adjacent the engineer's valve, air pressure flow responsive signal control means connected between the engineer's valve and brake pipe and control connections between the signal flow responsive means to cause operation of the signal to indicate dangerous conditions of leakage and overcharging in the brake pipe.

4. An air brake system for a railway train comprising a locomotive having a source of pressure, a brake pipe, a feed valve and engineer's valve connected between the brake pipe and pressure source, said feed valve acting automatically to limit the rate of pressure flow and pressure in the brake pipe to preselected values to compensate for normal leakage and to keep the brakes released, said engineer's valve being movable to a running position for rendering the feed valve operative, and being movable to a release position to cause an increase rate of pressure and pressure flow to the brake pipe above the preselected values to cause quick release of the brakes, said engineer's valve also being movable to service and emergency brake application positions to cause different rates of pressure reduction in the brake pipe to cause service and emergency brake application, a signal adjacent the engineer's valve, two way pressure flow responsive signal control means connected between the engineer's valve and brake pipe and control connections between the signal and signal control means to cause operation of the signal to indicate dangerous leakage and overcharging conditions in the brake pipe, and a train pipe connected to the locomotive brake pipe for control of the car brakes by the engineer's valve and feed valve.

ALBERT L. MACAN.